US 11,315,036 B2

(12) United States Patent
Chikkala et al.

(10) Patent No.: US 11,315,036 B2
(45) Date of Patent: Apr. 26, 2022

(54) PREDICTION FOR TIME SERIES DATA USING A SPACE PARTITIONING DATA STRUCTURE

(71) Applicant: PayPal, Inc., San Jose, CA (US)

(72) Inventors: Raveendra Babu Chikkala, Chennai (IN); Aryan Sisodia, Greater Noida (IN); Ramaguru Ramasubbu, Chennai (IN)

(73) Assignee: PayPal, Inc., San Jose, CA (US)

( * ) Notice: Subject to any disclaimer, the term of this patent is extended or adjusted under 35 U.S.C. 154(b) by 626 days.

(21) Appl. No.: 16/236,941

(22) Filed: Dec. 31, 2018

(65) Prior Publication Data

US 2020/0210886 A1 Jul. 2, 2020

(51) Int. Cl.
*G06N 20/00* (2019.01)
*G06N 5/02* (2006.01)

(52) U.S. Cl.
CPC .............. *G06N 20/00* (2019.01); *G06N 5/02* (2013.01)

(58) Field of Classification Search
CPC combination set(s) only.
See application file for complete search history.

(56) References Cited

U.S. PATENT DOCUMENTS

| | | | |
|---|---|---|---|
| 10,719,641 B2 * | 7/2020 | Morczinek | G06N 3/0454 |
| 2002/0097912 A1 | 7/2002 | Kimmel et al. | |
| 2003/0231190 A1 | 12/2003 | Jawerth et al. | |
| 2013/0046793 A1 | 2/2013 | Reznik et al. | |
| 2015/0339572 A1 | 11/2015 | Achin et al. | |

OTHER PUBLICATIONS

Shen et al, "A Fast Volume Rendering Algorithm for Time-Varying Fields Using a Time-Space Partitioning (TSP) Tree," IEEE, (seven pages) (Year: 2009).*
Zheng et al, "Multidimensional K-Nearest Neighbor Model Based on EEMD for Financial Time Series Forecasting," Elsevier, Physica A: Statistical Mechanics and Its Applications, vol. 477, Jul. 1, 2017, pp. 161-173 (Year: 2017).*
Favinger, "The Polar Coordinate System", M.A. Thesis, University of Nebraska-Lincoln, Nebraska, 2008 (pp. 1-25) (Year: 2008).*

(Continued)

*Primary Examiner* — Daniel T Pellett
(74) *Attorney, Agent, or Firm* — Kowert, Hood, Munyon, Rankin & Goetzel, P.C.

(57) ABSTRACT

Techniques are disclosed for a computer system to predict a next sample for a data stream that specifies data values of one or more variables. A current subset of data values and previous subsets of data values is determined, and polyline simplification techniques may then be used on the subset to produce a reduced-sample current subset of data values that are converted to an angular coordinate system. A space partitioning data structure such as a k-dimensional tree that stores converted reduced-sample previous subsets of the data stream may then be traversed to determine one or more nearest neighbors to the current subset. The predicted next sample for the data stream may be generated from the nearest neighbors. The space partitioning data structure may be updated to include the current subset, and the process may be repeated with a new current subset.

20 Claims, 10 Drawing Sheets

(56) References Cited

OTHER PUBLICATIONS

Shi et al, "Performance Evaluation of Line Simplification Algorithms for Vector Geneeralization," The British Cartographic Society; The Cartographic Journal, vol. 43, No. 1, pp. 27-44 (Mar. 2006) (Year: 2006).*
Hershberger et al. "Adaptive Spatial Partitioning for Multidimensional Data Streams", online Publication Jul. 28, 2006, Algorithmica, Springer Science+Business Media, Inc., pp. 97-1117. (Year: 2006).*
Pettinger et al, "Space Partitioning for Scalable K-Means", IEEE, 2010 Ninth International Conference on Machine Learning and Applications (Dec. 12-14, 2010) (Year: 2010).*
Sommer et al., "Predictive Load Balancing in Cloud Computing Elements based on Ensemble Forecasting", IEEE, (Jul. 17-22, 2016 International Conference on Autonomic Computing, pp. 300-307. (Year: 2016).*
Michel et al. "Tree-Structured Nonlinear Signal Modeling and Prediction", IEEE, IEEE Transactions on Signal Processing, vol. 47 No. 11, Nov. 1999 (pp. 3027-3041). (Year: 1999).*
Ahmad et al. "Wind Information Uplink to Aircraft Performing Interval Management Operations," [online] (May 2016) 15th AIAA Aviation Technology, Integration, and Operations Conference, 2015 [retrieved on Mar. 2, 2020) Retrieved from the Internet<URL:https://ntrs.nasa.gov/archive/nasa/casi.ntrs.nasa.gov/20160007 418.pdf > entire document (especially p. 18).
International Search Report and Written Opinion in PCT Appl. No. PCT/US2019/067733 dated Mar. 19, 2020, 13 pages.

* cited by examiner

```
┌─────────────────────────────────────────────────────────────────────┐
│ Receive a data stream that specifies data values of one or more     │
│ variables as a function of time, where the data stream includes a   │
│ current subset of data values and a plurality of previous subsets   │
│ of data values                                                      │
│ 910                                                                 │
└─────────────────────────────────────────────────────────────────────┘
                                    │
                                    ▼
┌─────────────────────────────────────────────────────────────────────┐
│      Determine a predicted next sample for the data stream          │
│                               920                                   │
│  ┌───────────────────────────────────────────────────────────────┐  │
│  │ Perform one or more polyline simplification techniques on the │  │
│  │ current subset of data values to produce a reduced-sample     │  │
│  │ current subset of data values                                 │  │
│  │ 922                                                           │  │
│  └───────────────────────────────────────────────────────────────┘  │
│                                 │                                   │
│                                 ▼                                   │
│  ┌───────────────────────────────────────────────────────────────┐  │
│  │ Convert the reduced-sample current subset of data values to   │  │
│  │ an angular coordinate system                                  │  │
│  │ 924                                                           │  │
│  └───────────────────────────────────────────────────────────────┘  │
│                                 │                                   │
│                                 ▼                                   │
│  ┌───────────────────────────────────────────────────────────────┐  │
│  │ Store the converted reduced-sample current subset of data     │  │
│  │ values in a space partitioning data structure that includes   │  │
│  │ converted reduced-sample previous subsets of data values that │  │
│  │ have been produced by performing the one or more polyline     │  │
│  │ simplification techniques on ones of the plurality of         │  │
│  │ previous subsets of data values, and converting resulting     │  │
│  │ reduced-sample previous subsets of data values to angular     │  │
│  │ coordinates                                                   │  │
│  │ 926                                                           │  │
│  └───────────────────────────────────────────────────────────────┘  │
│                                 │                                   │
│                                 ▼                                   │
│  ┌───────────────────────────────────────────────────────────────┐  │
│  │ Determine for the converted reduced-sample current subset of  │  │
│  │ data values, one or more nearest neighbors from the converted │  │
│  │ reduced-sample previous subsets of data values stored in the  │  │
│  │ space partitioning data structure                             │  │
│  │ 928                                                           │  │
│  └───────────────────────────────────────────────────────────────┘  │
│                                 │                                   │
│                                 ▼                                   │
│  ┌───────────────────────────────────────────────────────────────┐  │
│  │ Generate the predicted next sample for the data stream using  │  │
│  │ the determined one or more nearest neighbors                  │  │
│  │ 930                                                           │  │
│  └───────────────────────────────────────────────────────────────┘  │
└─────────────────────────────────────────────────────────────────────┘
                                    │
                                    ▼
┌─────────────────────────────────────────────────────────────────────┐
│            Output the predicted next sample for the data stream     │
│                               940                                   │
└─────────────────────────────────────────────────────────────────────┘
```

*Fig. 9*

PREDICTION FOR TIME SERIES DATA USING A SPACE PARTITIONING DATA STRUCTURE

BACKGROUND

Technical Field

This disclosure relates generally to techniques for predicting future values of a data stream.

Description of the Related Art

Computer systems commonly receive data streams that include a succession of values of one or more variables or parameters. These computers may use techniques such as regression to analyze the received data in order to make predictions about future values of those data streams. With large increases in the amount of data in these data streams, however, such predictions have become more and more complex and computationally expensive. In some systems with large amounts of data, for example, the use of current prediction techniques may render the prediction unduly slow or ineffective, such as when predicted data values for a particular time window are not able to be computed before that time window has already passed.

BRIEF DESCRIPTION OF THE DRAWINGS

FIG. 9 is a flow diagram illustrating a method for determining predicted next samples for a data stream using a space partitioning data structure, according to some embodiments.

Figure 1:
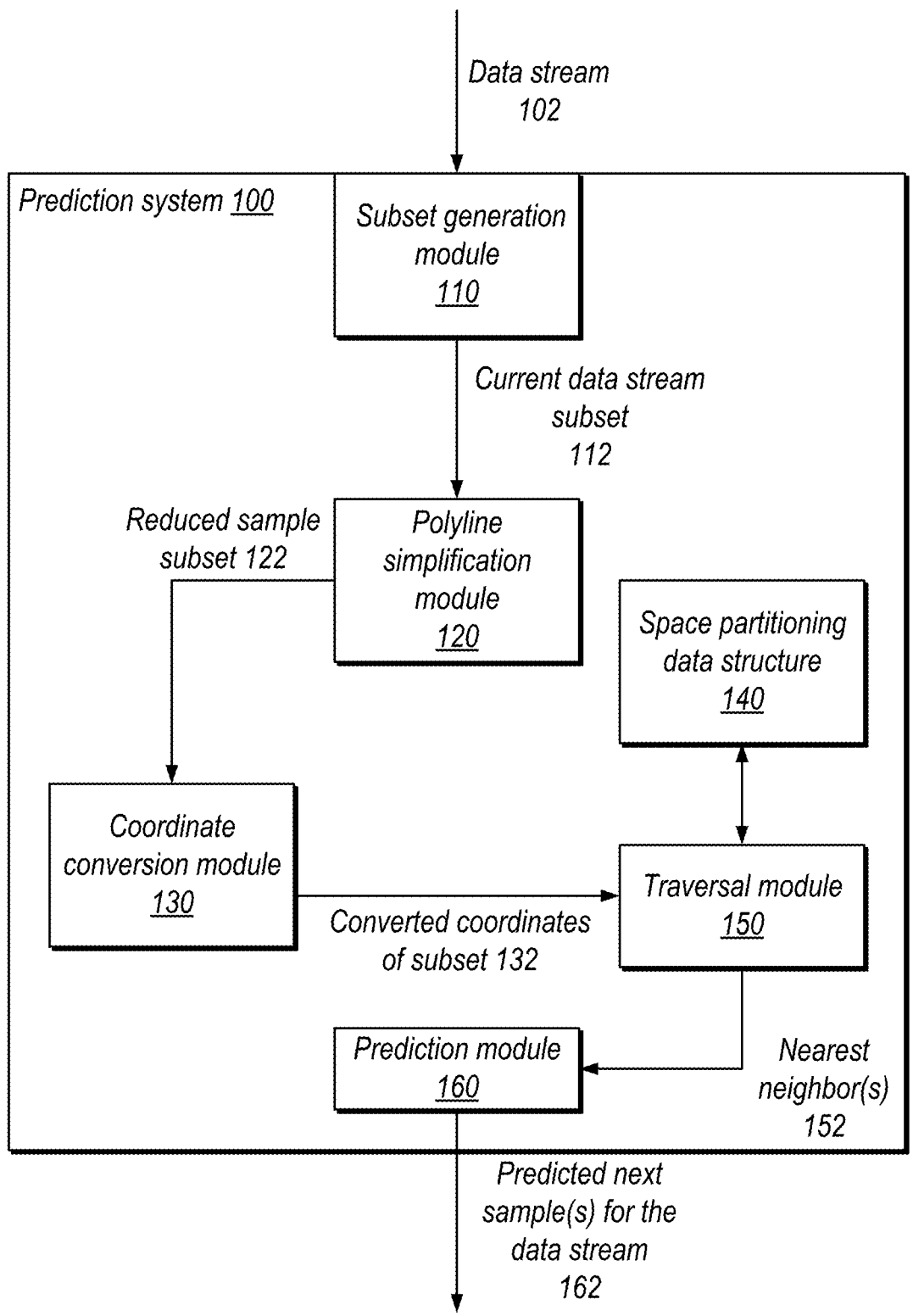
FIG. 1 is a block diagram illustrating an overview of a prediction system for predicting next samples for a data stream, according to some embodiments.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "computer system configured to predict one or more next samples for a data stream" is intended to cover, for example, a computer system that performs this function during operation, even if it is not currently being used (e.g., when its power supply is not connected). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed mobile computing device, for example, would not be considered to be "configured to" perform some specific function, although it may be "configurable to" perform that function. After appropriate programming, the mobile computing device may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor and is used to determine A or affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the term "processing element" refers to various elements configured to execute program instructions (or portions thereof or combinations thereof). Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

DETAILED DESCRIPTION

Techniques are disclosed for predicting one or more next samples for a data stream. In disclosed embodiments, the data stream specifies data values of one or more variables of a system as a function of time. A high volume of activity at certain times in comparison with other times for the data stream may cause delays and/or failures in making predictions. For example, in the case of a database computer system, the system may experience a high volume of accesses at a given time, thus causing the database to overload. Various current techniques for predicting future output of a system are slow and utilize a large amount of processing time. Disclosed techniques for predicting next samples for a data stream, however, may advantageously decrease processing time for one or more predictions, which in turn may allow for data-driven decisions to be made prior to changes occurring in the data stream (e.g., perform preventative measures for the system).

Overview of a Prediction System

Predicting future data values for a data stream is frequently performed by computer systems, and making such predictions efficiently (i.e., quickly) may advantageously prevent delays in the system, particularly where such data is time sensitive. In various disclosed embodiments the use of polyline simplification to reduce sample subsets of data, conversion to another coordinate system, and storing the converted reduced-sample subsets in a space partitioning data structure such as a k-dimensional tree may lead to faster prediction times.

FIG. 1 is a block diagram illustrating an overview of a prediction system for predicting next samples for a data stream, according to some embodiments. In the illustrated embodiment, prediction system 100 includes subset generation module 110, polyline simplification module 120, coordinate conversion module 130, space partitioning data structure 140, traversal module 150, and prediction module 160.

The term "sample" is used herein to denote those values of one or more variables (e.g., a measurement of load on a database system) that are received as part of a data stream. For example, some variable might be measured once per second and those data values may be conveyed as "samples" of a data stream. Note that samples may be multi-dimensional, with each sample including data values for more than one variable. Further, a sample conveyed as part of a data stream may itself have been generated from one or more values—for example, each sample in a data stream indicative of database load might be computed by averaging two or more underlying database load values. Still further, in some instances, a "sample" may itself consist of multiple data values—for example, a "sample" might consist of 10 seconds worth of data of some variable, where the data stream includes six samples every minute.

Subset generation module 110, in the illustrated embodiment, receives data stream 102. Using received data stream 102, subset generation module 110 determines a current data stream subset 112, which may include the most recent sample and a set of previous samples. Examples of generating subsets are discussed below with reference to FIGS. 2A and 2B. A data stream that includes variables specified as a function of time may also be referred to as "time series data." The terms "data stream" and "time series data" are intended to broadly refer to any sequence of data values that is ordered according to time; in some instances, there may be timestamps or other indications of a time that each value in the data stream was received, but in other cases, it may be understood that data values in a data stream are samples taken at regular time intervals, and are ordered in the data stream in the order in which they were received without any type of corresponding timestamp.

A "subset of data values" as used herein, refers to less than all of the samples received by the computing system (e.g., prediction system 100) in the data stream. Thus, while a data stream might have, in some cases, millions of samples, a group of 1200 of these samples, for example, would be a subset of the data values in the data stream. The "current subset of data values" refers to the most recent N samples in the data stream, where N is less than the number of samples in the data stream. Similarly, "previous subsets of data values" refer to one or more subsets that occur before the current subset in the data stream with respect to time. Note that, in some embodiments, the previous subsets of data values are non-overlapping (i.e., no sample from a particular point in the timeline that is included in a first previous subset of data values is also included in any other previous subset of data values), while in other embodiments, previous subsets of data values may be partially overlapping.

Polyline simplification module 120 receives the current subset from subset generation module 110 and reduces the number of samples in the subset to produce reduced-sample subset 122. In some embodiments, polyline simplification module 120 reduces the number of samples in each subset by the same amount (e.g., if the input subsets have the same size, then the reduced sample subsets may each contain the same number of samples after reduction). Polyline simplification module 120 may utilize one or more polyline simplification techniques to reduce the number of samples in one or more subsets. Examples of reducing the number of samples in a subset using one or more polyline simplification techniques are discussed below with respect to FIG. 3. A "reduced-sample" current or previous subset of data values refers to a subset that has been reduced in number relative to the original number of samples in the subset of values extracted from the data stream. Thus, if a current or previous subset of data values has 120 samples, in one implementation, a reduced-sample version of such a subset might have 30 samples.

Coordinate conversion module 130 converts the samples of the reduced-sample subset 122, received from the polyline simplification module 120, to generate converted coordinates 132. In some embodiments, the samples are converted from rectangular coordinates to angular coordinates. For example, coordinate conversion from rectangular coordinates to angular coordinates is discussed below with respect to FIG. 4.

Space partitioning data structure 140 stores data for prior subsets. In some embodiments, this data has been reduced and converted similarly to the operations performed on the current subset. Examples of space partitioning data structures are discussed below with reference to FIG. 5. A "data structure" refers to an organization of data values in a computer system that has some relationship among the data values and to which functions and operations may be applied. A data structure for a date, for example, might have separate data values for month, day, and year; a function associated with the data structure might return what day number the date is within the current year. A "space partitioning data structure" is understood according to its ordinary meaning in the art, and includes a data structure that divides a space into two or more disjoint subsets. A k-dimensional tree is one example of a space partitioning data structure.

Traversal module 150 traverses space partitioning data structure 140 to determine one or more nearest neighbors for the current subset. As used herein, a "nearest neighbor" of a particular subset refers to one or more other subsets having the lowest distance from the particular subset according to a specified similarity metric (e.g., cosine similarity, Euclidean distance). In some embodiments, the similarity metric is determined based on differences between samples at each index in a subset. As one example, the dot product between subsets may provide a similarity metric, but may be computationally expensive. As another example, for embodiments with conversion to angular coordinates and subsets with n theta values, the following equation provides a similarity value between two subsets.

$$\text{Similarity value} = \frac{1}{\sqrt{(\theta_{A1}-\theta_{B1})^2+(\theta_{A2}-\theta_{B2})^2+\ldots+(\theta_{An}-\theta_{Bn})^2}}$$

In some embodiments, traversal module 150 or another module stores the current data stream subset in the space partitioning data structure, e.g., to be potentially used in predictions for subsequent subsets. Each node in the space partitioning data structure may store coordinates of samples for the corresponding subsets (e.g., angle and magnitude) and coordinates of the next sample following the subset for use in prediction.

Prediction module 160 receives one or more nearest neighbor(s) 152 from traversal module 150. Based on receiving nearest neighbor(s) 152, prediction module 160 generates and outputs predicted next sample(s) 162 for the data stream 102. In embodiments that find multiple nearest neighbors, prediction module 160 averages characteristics of the next sample following each of the nearest neighbors to generate predicted characteristics. Note that the output performed by prediction module 160 may be provided as either an internal or external output of prediction system 100.

As used herein, the term "module" refers to circuitry configured to perform specified operations or to physical non-transitory computer readable media that store information (e.g., program instructions) that instructs other circuitry (e.g., a processor) to perform specified operations. Modules may be implemented in multiple ways, including as a hardwired circuit or as a memory having program instructions stored therein that are executable by one or more processors to perform the operations. A hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

Example Subset Generation

Figure 2A:
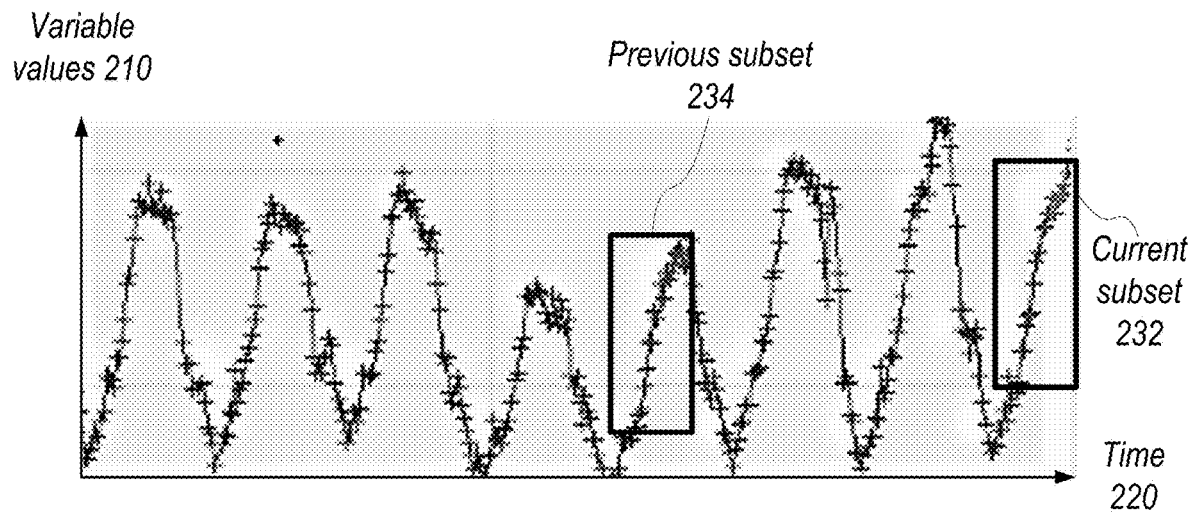
FIG. 2A is a graph illustrating an example of generating subsets of data values of a data stream, according to some embodiments

FIG. 2A is a graph illustrating an example of generating subsets of data values of a data stream, according to some embodiments. In the illustrated embodiment, time series data is shown in rectangular coordinates, where the x-axis specifies time 220 and the y-axis specifies the values 210 of a variable. (In various embodiments, time series data may include values for more than one variable.) In the illustrated embodiment, a current subset 232 and a previous subset 234 are shown to contain respective subsets of data values from the time series data.

In some embodiments, variable values 210 may be one or more variables that are specified as a function of time. A variable is any quantity that may be measured or specified. The following are non-limiting examples of variables: database load, data throughput, stock pricing, computer resource utilization (e.g., battery life), power demand, temperature, humidity.

Figure 2B:
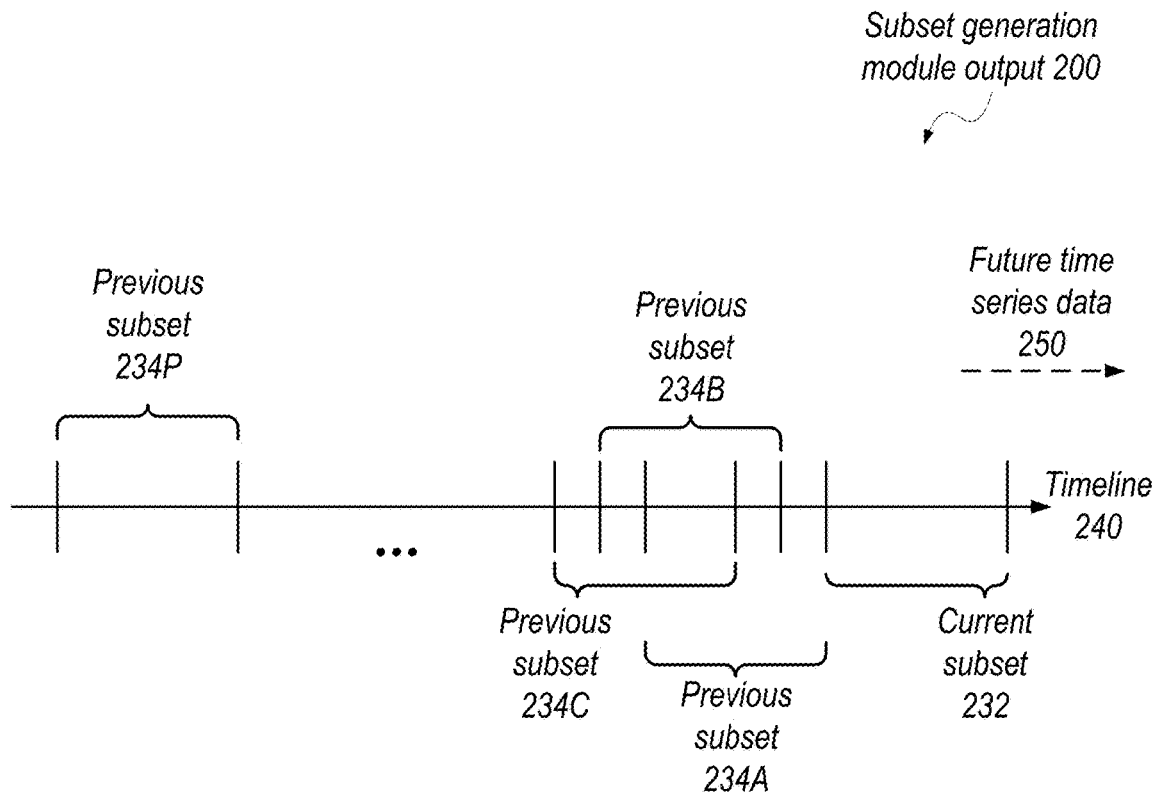
FIG. 2B illustrates example output of the subset generation module discussed with reference to FIG. 1 on a timeline, according to some embodiments.

FIG. 2B illustrates example output of the subset generation module discussed with reference to FIG. 1 on a timeline, according to some embodiments. In the illustrated embodiment, output 200 of a subset generation module (e.g., module 110) includes current subset 232 and previous subsets 234A-234P shown on timeline 240, where future time series data 250 may occur to the right of the timeline.

Current subset 232, in the illustrated embodiment, includes the most recently occurring samples of data values for time series data, while previous subsets 234 include previously occurring (relative to the current subset on timeline 240) data values of the time series data. As shown in the illustrated embodiment, P previous subsets may be generated by subset generation module 110. In the illustrated embodiment, previous subsets are shown on timeline 240 with overlapping samples of data values, while current subset 232 is not. In some embodiments, current subset 232 may include samples of data values that overlap with samples of one or more previous subsets 234. In some embodiments, the previous subsets are non-overlapping.

Note that the current subset and the one or more previous subsets generated by module 110 may contain the same number of samples (e.g., the subsets are the same size). As one example, if samples are taken every 10 seconds, the time series data used for prediction might contain up to 21 days of data (e.g., 181,440 samples of data), with each subset of the set of time series data including 120 samples (e.g., 20 minutes of data).

Example Polyline Simplification Module

Figure 3:
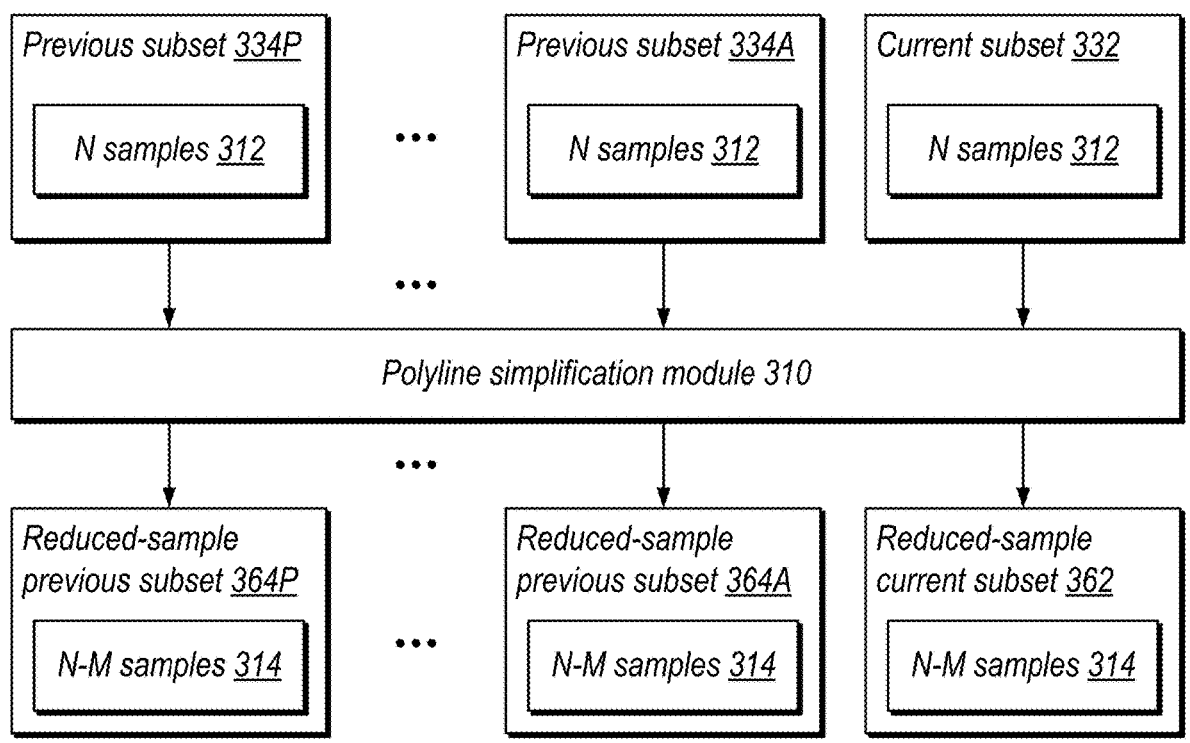
FIG. 3 is a block diagram illustrating an example of reducing the number of samples in subsets using polyline simplification techniques, according to some embodiments.

FIG. 3 is a block diagram illustrating an example of reducing the number of samples in subsets using polyline simplification techniques, according to some embodiments. In the illustrated embodiment, polyline simplification module 310 is configured to reduce the number of samples 312 in each of current subset 332 and previous subsets 334.

Current subset 332 and previous subsets 334, in the illustrated embodiment, each include N samples 312. Based on receiving subset 332 and subsets 334, polyline simplification module 310 reduces the number of samples in each subset to generate reduced-sample current subset 362 and reduced-sample previous subsets 364 with N-M samples 314, where N is the original number of samples in each subset and M is the number of samples that each subset is reduced by. For example, the current and previous subsets may contain 120 samples (where N is 120). In this example, the number of samples in each subset is reduced to 30 samples (where M is 90 and N–M is 30). In some embodiments, each current subset is simplified and stored upon receipt, and becomes a previous subset once another sample arrives.

"Polyline simplification" is used in this disclosure according to its ordinary meaning in the art, which includes processes for reducing the number of points in a data series while maintaining its basic shape. One example of polyline simplification is Visvalingam's algorithm, which generalizes data by eliminating one or more data values (e.g., points) that are less significant to the definition of the shape of a line formed from the data values. The elimination process, in some embodiments, is based on the triangular area formed by the two lines connecting a sample to its two neighboring samples and the line drawn from one of the neighboring samples to the other neighboring sample. Triangles are formed in this manner for all samples in the subset and the triangle with the smallest area dictates the sample (e.g., the middle sample of each group of three samples) that is removed from the subset.

Examples of polyline simplification techniques include, without limitation: Visvalingam's simplification, Douglas-Peucker simplification, Reumann-Witkam simplification, Opheim simplification, Lang simplification, Zhao-Saalfeld simplification, etc.

In some embodiments, the samples included in a given subset are considered data points for that subset, where the subset is a vector in a multi-dimensional space (e.g., the number of samples in the subset dictates the dimensionality of the subset). Polyline simplification techniques may be used to decrease the dimensionality of these vector subsets, by reducing the number of samples (e.g., the number of data points) in the subsets.

In some embodiments, using polyline simplification techniques to reduce the number of samples in subsets of time series data may advantageously improve the processing speed of a computer system (e.g., prediction system 100). For example, using Visvalingam's polyline simplification technique to reduce the number of samples in subsets of time series data, as discussed above with reference to FIG. 3 may advantageously decrease the processing time of a prediction system by a factor of four without substantial reduction in prediction accuracy, for some example data sets.

Example Coordinate Conversion

Figure 4:
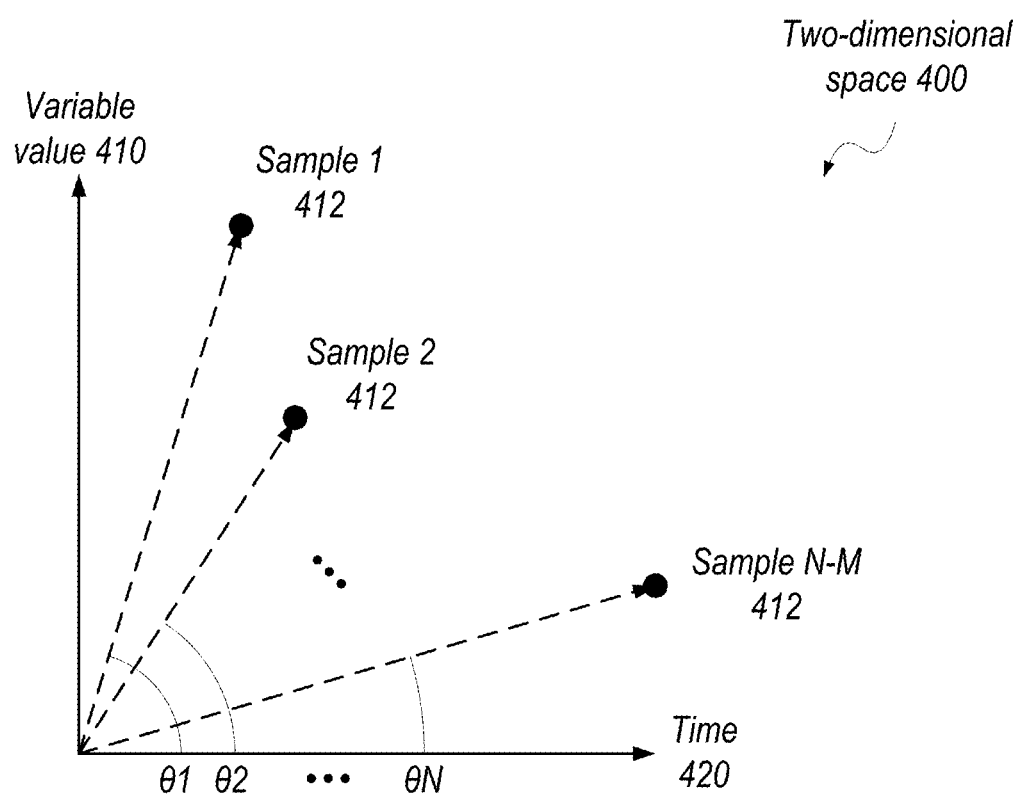
FIG. 4 is a diagram illustrating example angle values for samples of a subset in a two-dimensional space generated by the coordinate conversion module of FIG. 1, according to some embodiments.

FIG. 4 is a diagram illustrating example angle values for samples of a subset in a two-dimensional space generated by the coordinate conversion module discussed with reference to FIG. 1, according to some embodiments. In the illustrated embodiment, two-dimensional space 400 can be represented using a rectangular coordinate system that includes an x-axis representing time 420 and a y-axis representing a variable value 410 of a data stream. Note that the variable values may exist in a coordinate system with more than two dimensions.

The theta values shown in FIG. 4 are the output of a coordinate conversion module (e.g., coordinate conversion module 130) that converts rectangular coordinates to angular coordinates. In the illustrated embodiment, samples 412 are various samples of a reduced-sample subset (e.g., reduced-sample current subset 362). Samples 412 (e.g., sample 1 through sample N–M) of a reduced-sample subset are converted from rectangular coordinates to angular coordinates. As used herein, "angular coordinates" refers to a coordinate system in which at least one of the coordinates is expressed as an angle. Polar coordinates, which have a magnitude coordinate value r and an angular coordinate value $\theta$, are one example of angular coordinates.

In the illustrated embodiment, theta values are determined as the angle between the x-axis (e.g., time 420) and the samples 412. For example, the theta values shown in FIG. 4 may be determined as the inverse tangent of the y-axis value divided by the x-axis value of each sample (e.g., arctan(y/x)). In embodiments in which samples exist in a space of three or more dimensions, each sample may have multiple thetas, meaning that each subset includes multiple thetas for each sample. For example, a reduced-sample subset containing 30 samples, where each sample includes three dimensions, might include a total of 90 thetas (e.g., three thetas for each of the thirty samples).

Example Space Partitioning Data Structure

Figure 5:
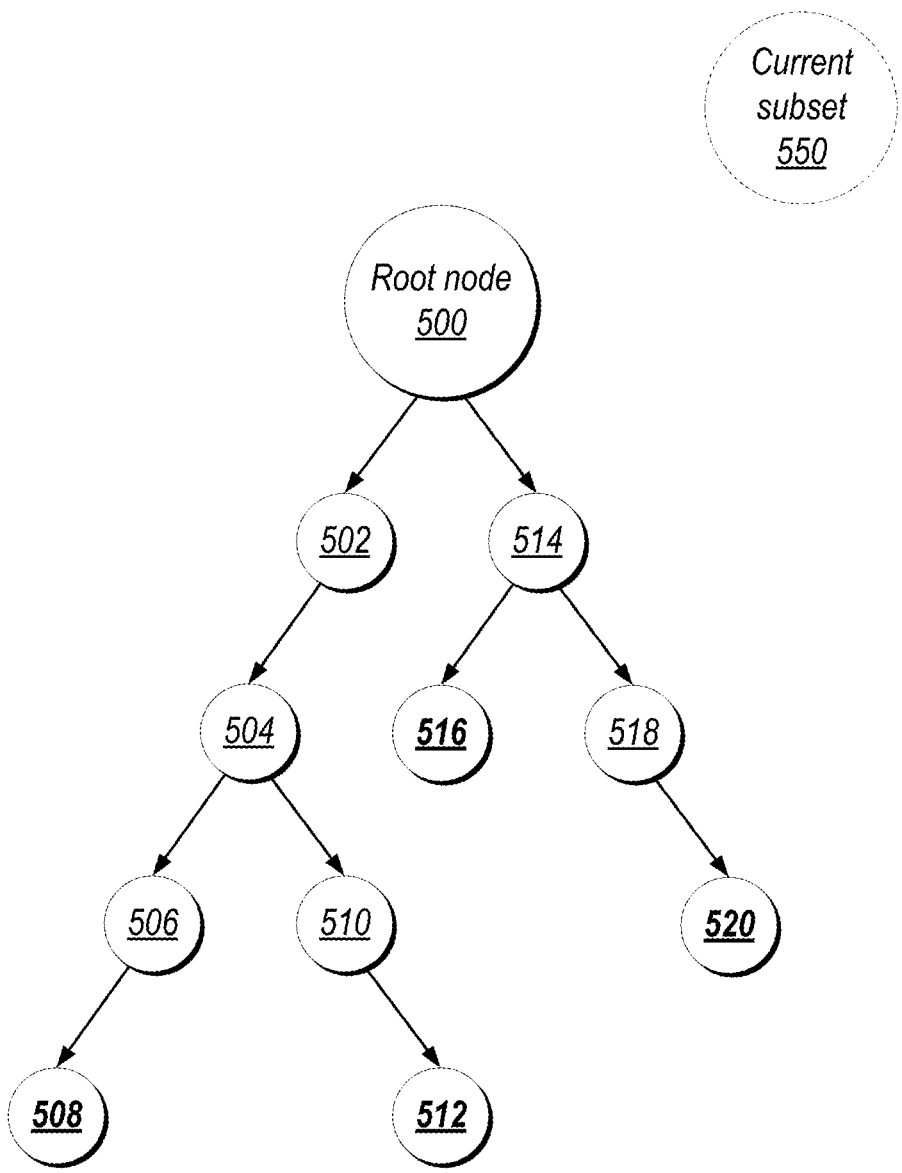
FIG. 5 is a block diagram illustrating an example of a space partitioning data structure, according to some embodiments.

FIG. 5 is a block diagram illustrating an example of a space partitioning data structure, according to some embodiments. In the illustrated embodiment, the space partitioning data structure is a tree, but non-tree structures may be implemented in other embodiments. Non-limiting examples of space partitioning data structure include: binary tree, k-dimensional tree, R-tree, bounding volume hierarchy tree, quad tree, octrees, and the like.

In the illustrated embodiment, the structure includes a root node 500 and a plurality of other nodes 502-520. In the illustrated embodiment, nodes 508, 512, 516, and 520 are leaf nodes, since they have no child nodes. In k-dimensional tree embodiments, the tree structure may be constructed according to well-known techniques. For example, the subset stored at root node 500 may be a previous subset with a median value of a first dimension of the N-dimensional subsets (e.g., a median value of the first theta in the subset of thetas).

In some embodiments, the current subset 550 is used to traverse the tree to find one or more nearest neighbors, examples of which are described in detail below. In some embodiments, the current subset 550 is inserted into the tree (e.g., along with the subsequent sample value). Insertions into a space partitioning data structure may be performed according to various well-understood techniques. For trees, this may include balancing operations, in some embodiments. In some embodiments, an oldest node may be deleted in conjunction with adding current subset 550, e.g., to maintain a particular sized tree. In other embodiments, the current subset may not be added in real time. Rather, the data structure may be fixed or may be updated periodically (e.g., hourly or daily) with subsets that occurred during the period.

Note that, for k-dimensional tree embodiments, the various levels below the root node may correspond to successive ones of the k dimensions. Thus, for example, if the k-dimensional tree were a 2-D tree, the first level may be aligned with the first dimension, the second level may be aligned with the second dimension, the third level would be aligned with the first dimension, etc. Accordingly, comparisons for placing a subset may be based on a particular index within the subset for each level.

Example Traversal and Prediction Modules

Figure 6:
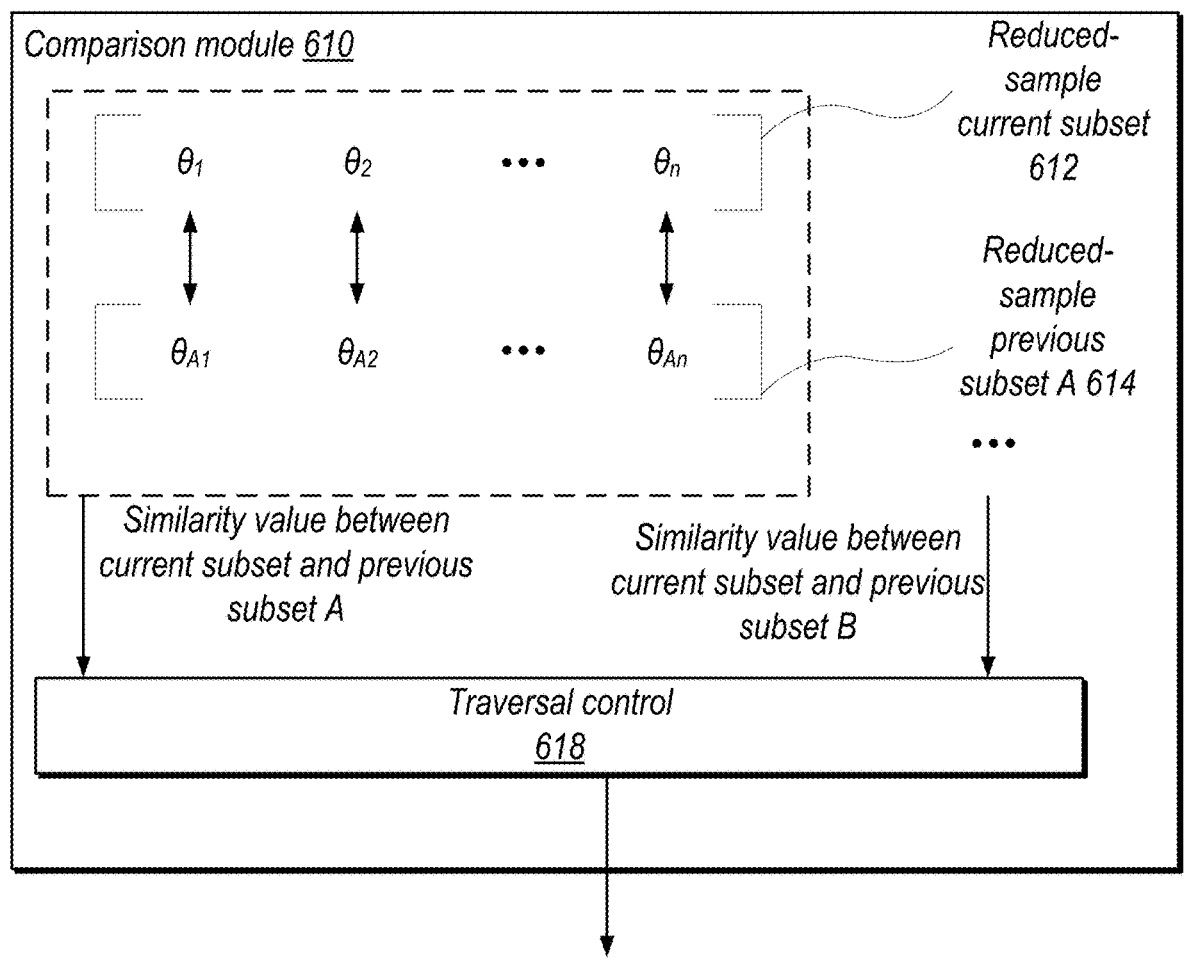
FIG. 6 is a block diagram illustrating an example of comparing a current and previous subset to generate a similarity value, according to some embodiments.

FIG. 6 is a block diagram illustrating an example of comparing a current and previous subset to generate a similarity value, according to some embodiments. In some embodiments, similarity values are used to traverse the space partitioning data structure to find nearest neighbor(s).

Comparison module 610, in the illustrated embodiment, compares reduced-sample current subset 612 and reduced-sample previous subset A 614. In the illustrated embodiment, module 610 compares the theta values at each index in the subset vector. As discussed above, the following equation 1 may be used to generate a similarity value based on thetas:

$$\sqrt{(\theta_{A1}-\theta_{B1})^2+(\theta_{A2}-\theta_{B2})^2+...+(\theta_{An}-\theta_{Bn})^2} \quad (1)$$

In these embodiments, a smaller similarity value indicates a greater similarity between sub sets.

In some embodiments, cosine comparisons may be used to generate similarity values, e.g., by comprising cosines of the thetas at the same index in different subsets.

Traversal control 618, in the illustrated embodiment, receives two similarity values, one between the current subset and previous subset A and another between the current subset and previous subset B (the comparison for subset B is not explicitly shown). In some embodiments, traversal control 618 generates data structure traversal signals, e.g., to traverse the space partitioning data structure in a direction corresponding to greater similarity. Note that traversal control based on two similarity values is shown for purposes of illustration, but in other embodiments, comparison between various numbers of prior subsets with the current subset may be used for traversal decisions.

Figure 7:
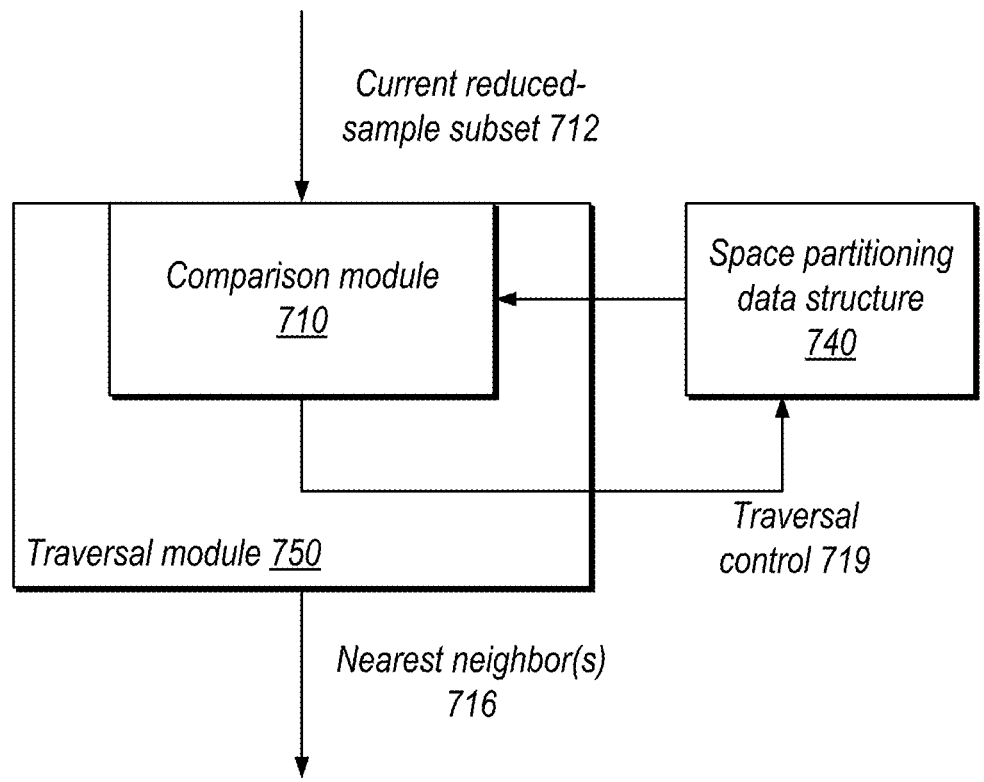
FIG. 7 is a block diagram illustrating example determination of one or more nearest neighbors using a traversal module, according to some embodiments.

FIG. 7 is a block diagram illustrating an example of a determination of one or more nearest neighbors using a traversal module, according to some embodiments. In the illustrated embodiment, traversal module 750 includes comparison module 710, which generates traversal control 719 based on comparing the reduced-sample current subset 712 with multiple subsets stored in space partitioning data structure 740.

In some embodiments, the getNearestNeighbor function may be implemented according to the following computer code. Speaking generally, the initial portion of the "predict" function above may traverse the tree to determine a current node, which may be used as a starting point for the nearest neighbor algorithm specified by the getNearestNeighbor function.

```
private KDNode getNearestNeighbor(KDNode currentNode, KDNode nearestNeighbor,
Block testBlock)
{
    if (currentNode == rootNode)
        return nearestNeighbor;
    if (currentNode.getBlock( ).getDifferenceInTheta(testBlock) <
nearestNeighbor.getBlock( ).getDifferenceInTheta(testBlock))
        nearestNeighbor = currentNode;
    if (currentNode.getSibling( ) != null &&
currentNode.getBlock( ).getDifferenceInTheta(testBlock) >
currentNode.getSibling( ).getBlock( ).getDifferenceInTheta(testBlock))
        return getNearestNeighbor(currentNode.getSibling( ).getNextOfKin( ),
nearestNeighbor, testBlock);
    else
        return getNearestNeighbor(currentNode.getParent( ), nearestNeighbor, testBlock);
}
```

In the illustrated embodiment, traversal module 750 outputs one or more nearest neighbor(s) 716 based on performing one or more k-nearest neighbor determination techniques during the traversal. Note that module 750 may, in some embodiments, implement one or more of various types of machine learning techniques, including one or more of the following: nearest centroid, k-means, Gaussian mixture, mean shift, bilateral filtering, etc.

An example technique implemented by module 750 includes k-nearest neighbors, which is a well-known technique. Note that traversing the space partitioning data structure using a k-nearest neighbor technique may be implemented similarly to the techniques used to generate the space partitioning data structure. For example, in some embodiments, traversal of the data structure is performed based on the dimension of each subset associated with a particular level of the data structure (e.g., the first sample of the current subset is compared with the first sample of the previous subset stored at the root node, the second sample of the current subset is compared with the second sample of one or more of the previous subset(s) stored at the second level, and so on). The following program code represents one non-limiting technique for determining a single nearest neighbor using the k-nearest neighbor technique that may be implemented by module 750:

```
public double predict (Block testBlock)
{
    KDNode currentNode = rootNode;
    while (currentNode != null)
    {
        boolean goToLeftChild =
currentNode.getBlock( ).getTheta(currentNode.get Alignment
Axis( )) > testBlock.getTheta(currentNode.getAlignmentAxis( ));
        if (currentNode.getChild(goToLeftChild) == null)
            break;
        else
            currentNode = currentNode.getChild(goToLeftChild);
    }
    Block nearestBlock = getNearestNeighbor(currentNode, currentNode,
testBlock).getBlock( );
    return nearestBlock.getResultantRecord( ).getCpu( ) *
testBlock.getMagnitude( ) / nearestBlock.getMagnitude( );
}
```

Note that the code shown above is one non-limiting example of implementing a k-nearest neighbor technique to determine a single nearest neighbor. In the example code, the "testBlock" corresponds to the current subset and a "current node" is a particular node at which the traversal process or nearest neighbor algorithm is currently located (e.g., as the tree is traversed, the current node changes/updates). The "getSibling" function may select a node that shares a parent node with the node on which it is called, if such a node exists. Similarly, the "getNextOfKin" function may select a node that is related to the node on which it is called, where the related node is selected in the following order: left child node (if present), right child node (if present), then parent node. This selection process may allow traversal of a branch of the tree corresponding to the sibling node. In the example code, the "getDifferenceInTheta" function corresponds to equation 1, discussed above with reference to FIG. 6.

In the example code shown above, the traversal process begins at the root node, which may store the subset having a median first sample value (e.g., medium theta value at the first index in the subsets). At the root node, the first sample of the current subset is compared with the first sample of the previous subset stored at the root node. Based on this comparison, the traversal may proceed to the left child node (e.g., if the first sample value of the current subset is smaller than the first sample value of the previous subset) or the right child node (e.g., if the first sample value of the current subset is larger than the first sample value of the previous subset). This process continues at the selected child node for the next (e.g., second) sample value of the two compared subsets (e.g., the current subset and the previous subset stored at the selected child node) and continues until traversal is complete, at which point the current node is used in the getNearestNeighbor function.

Once the traversal process is complete in the example code, a nearest-neighbors routine begins. Beginning at the current node on which traversal process ended, the example code performs the nearest-neighbors routine by moving up and/or down the tree to determine a single nearest neighbor. During this nearest-neighbors routine, the closest nearest neighbor found so far (identified as "nearestNeighbor") may be stored and may be updated by certain traversal moves (e.g., when the current node is closer than the prior nearestNeighbor). Once the example code reaches the root node, while performing the nearest-neighbors routine, the process ends and the determined nearest neighbor is returned.

Note that k-nearest neighbor and k-dimensional trees are well-known techniques. Further, although the symbol "k" is used for the number of neighbors/dimensions in these techniques, these values of k for k-nearest neighbor and k-dimensional tree may be unrelated (and thus different).

Note that the nodes of the space partitioning data structure may also contain subsequent sample values of each previous subset in addition to containing previous subsets. Additionally, note that similar techniques may be used by traversal module 650 to determine multiple nearest neighbors, however, the example discussed above with respect to FIG. 7 provides an example embodiment where a single nearest neighbor is determined.

Figure 8:
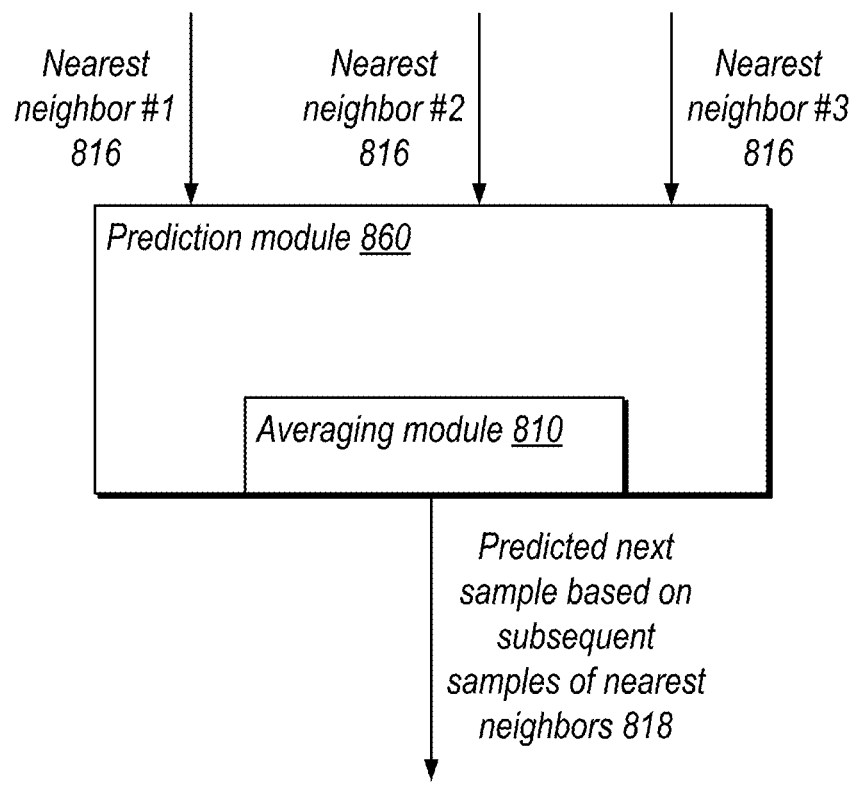
FIG. 8 is a block diagram illustrating an example prediction module, according to some embodiments.

FIG. 8 is a block diagram illustrating an example prediction module, according to some embodiments. In the illustrated embodiment, prediction module 860 is configured to implement averaging module 810 to generate a predicted next sample based on the subsequent samples of three nearest neighbor subsets 816. Various different techniques may be used to output predicted next sample(s); the approach described below utilizes averaging of the subsequent samples of various determined nearest neighbors.

Prediction module 860, in the illustrated example, receives information for three nearest neighbors 816 (different numbers of nearest neighbors may be received in other implementations). In some embodiments, the information includes a subsequent sample for each nearest-neighbor subset. Based on this information, prediction module 860 determines an average of the three subsequent samples to generate a predicted next sample 818 for the time series data. In some embodiments, the average of the three subsequent samples includes two different components: an average angular coordinate value (e.g., theta value) and a magnitude value. For example, the theta value of each of the subsequent samples of the three nearest neighbors 816 may be averaged to generate the theta value of the predicted next sample. Similarly, the magnitudes of the next samples of the three nearest neighbors 816 may be normalized, then averaged. This normalized, averaged magnitude value is then multiplied by the magnitude of the current subset to generate a magnitude coordinate value for the predicted next sample. In some embodiments, the predicted theta value and magnitude value are converted to another coordinate system such as rectangular coordinates. In the illustrated embodiment, prediction module 860 outputs the predicted next sample 818.

Example Method

FIG. 9 is a flow diagram illustrating a method for determining predicted next samples for a data stream using a space partitioning data structure, according to some embodiments. The method shown in FIG. 9 is described with respect to features also shown in FIG. 1, but may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At 910, in the illustrated embodiment, a computer system receives a data stream that specifies data values of one or more variables as a function of time, where the data stream includes a current subset of data values and a plurality of previous subsets of data values. In some embodiments, the computer system receives time series data that specifies load on a database computer system. In some embodiments, elements 920 through 980 are performed based on receiving the time series data that specifies load on a database computer system. Note, however, that method 900 is applicable to time series data of any type of variable.

At 920, in the illustrated embodiment, the computer system determines a predicted next sample for the data stream. In the illustrated embodiment, this includes elements 922-930, described below.

At 922, in the illustrated embodiment, the computer system performs one or more polyline simplification techniques on the current subset of data values to produce a reduced-sample current subset of data values. As noted above, one example of a possible polyline simplification technique is Visvalingam's algorithm.

At 924, in the illustrated embodiment, the computer system converts the reduced-sample current subset of data values to an angular coordinate system.

At 926, in the illustrated embodiment, the computer system stores the converted reduced-sample current subset of data values in a space partitioning data structure that includes converted reduced-sample previous subsets of data values that have been produced by performing the one or more polyline simplification techniques on ones of the plurality of previous subsets of data values, and converting resulting reduced-sample previous subsets of data values to angular coordinates. In some instances, the storing at 926 may be performed after determining the one or more nearest neighbors for the reduced-sample current subset of data values. At that point, the current subset (in converted, reduced-sample form) may be stored in the space partitioning data structure, thus allowing a new current subset of data values to be determined and the process of generating a new predicted sample to be repeated. As noted above, one example of the space partitioning data structure is a k-dimensional tree. As is known in the art, a topmost node of the k-dimensional tree may be referred to as the root node of the tree.

At 928, in the illustrated embodiment, the computer system determines, for the converted reduced-sample current subset of data values, one or more nearest neighbors from the converted reduced-sample previous subsets of data values stored in the space partitioning data structure. For example, element 928 may be performed using a nearest-neighbors algorithm or routine that traverses a k-dimensional tree. This nearest-neighbors algorithm may determine the node or nodes in the tree or other data structure that store a previous subset of data values having the lowest difference value relative to the current subset of data values. One possible way of computing a given difference value between the current subset of data values and a given previous subset of data values is to determine a sum of a square of differences of the respective angular coordinates. For example, this computation may include determining a first difference in the theta value of the first sample of the current and previous subsets, a second difference in the theta value of the second sample of each subset, and so on, for each sample in the subsets. These differences may then each be squared and added together to form a sum; the square root of this sum may be calculated as the difference value between these two subsets. In such an embodiment, the lower the difference value for a given previous subset, the more similar it is to the current sub set.

In some implementations, computing nearest neighbors may include traversing at least a portion of the space partitioning data structure such as a k-dimensional tree. The traversal process may begin with making traversal decisions at multiple levels of the tree data structure based on different samples of the reduced-sample current subset. In some embodiments, a nearest-neighbors routine is performed, starting at a node of the k-dimensional tree that is based on the traversing. Still further, the nearest-neighbor routine may include iteratively updating a current node and a current nearest neighbor.

In some embodiments, the iteratively updating the current node and the current nearest neighbor includes, upon determining that a difference value of a current node is not less than the difference value of the current nearest neighbor, determining whether a sibling node of the current node exists. If a sibling node of the current node exists that has a difference value that is less than the difference value of the current node, the system may select a next of kin node of the sibling node as an updated current node. If a sibling node does not exist that has a difference value that is less than the difference value of the current node, the system may select a parent node of the current node as an updated current node. In some embodiments, the iteratively updating the current node and the current nearest neighbor includes, upon determining that a difference value of a current node is less than the difference value of the current nearest neighbor, selecting the current node as an updated current nearest neighbor. In some embodiments, this routine continues until the current node is a root node of the tree data structure.

At 930, in the illustrated embodiment, the computer system generates the predicted next sample for the data stream using the determined one or more nearest neighbors.

At 940, in the illustrated embodiment, the computer system outputs the predicted next sample for the data stream.

In some embodiments, the computer system is configured to manage a database computer system using the predicted next samples. For example, in some embodiments, based on predicted next samples showing an increase in database load, the computer system is configured to implement one or more preventative measures for the database computer system.

In some embodiments, using polyline simplification techniques may reduce the number of data values used to predict future time series data values. Specifically, using polyline simplification techniques to reduce the number of samples in each subset of data values may advantageously decrease the processing time of the computer system (for predicting next samples for a data stream). Also, using coordinate conversions and cosine similarity or theta similarity techniques may improve performance without substantially degrading prediction accuracy, relative to dot product comparisons, for example. Using a space partitioning data structure in combination with performing a k-nearest neighbors algorithm may also advantageously decrease the time to identify nearest neighbors. This in turn may advantageously improve the processing speed of the computer system by providing nearest neighbors for predicting next samples in a shorter time relative to regression processes that do not use these techniques.

Example Computing Device

Figure 10:
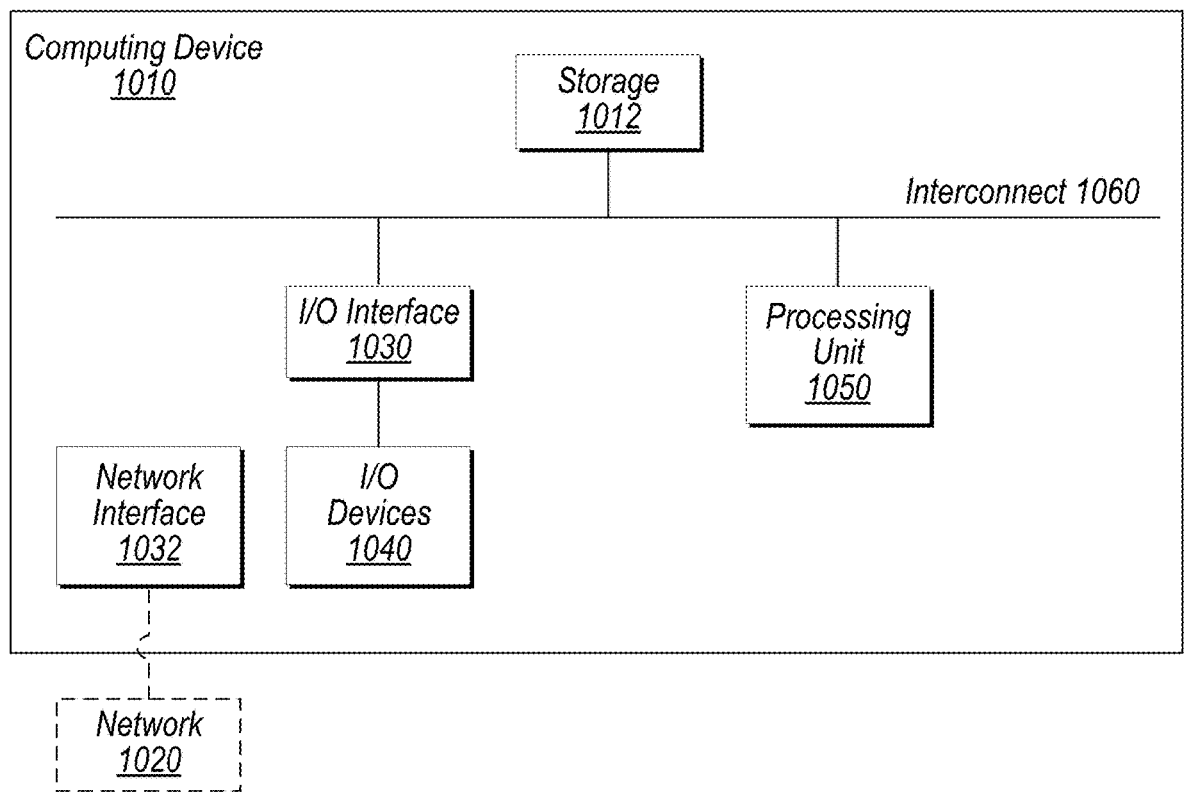
FIG. 10 is a block diagram illustrating an example computing device that may be used to implement various embodiments of the present disclosure.

Turning now to FIG. 10, a block diagram of one embodiment of computing device (which may also be referred to as a computing system) 1010 is depicted. Computing device 1010 may be used to implement various portions of this disclosure. Computing device 1010 may be any suitable type of device, including, but not limited to, a personal computer system, desktop computer, laptop or notebook computer, mainframe computer system, web server, workstation, or network computer. As shown, computing device 1010 includes processing unit 1050, storage 1012, and input/output (I/O) interface 1030 coupled via an interconnect 1060 (e.g., a system bus). I/O interface 1030 may be coupled to one or more I/O devices 1040. Computing device 1010 further includes network interface 1032, which may be coupled to network 1020 for communications with, for example, other computing devices.

In various embodiments, processing unit 1050 includes one or more processors. In some embodiments, processing unit 1050 includes one or more coprocessor units. In some embodiments, multiple instances of processing unit 1050 may be coupled to interconnect 1060. Processing unit 1050 (or each processor within 1050) may contain a cache or other form of on-board memory. In some embodiments, processing unit 1050 may be implemented as a general-purpose processing unit, and in other embodiments it may be implemented as a special purpose processing unit (e.g., an ASIC). In general, computing device 1010 is not limited to any particular type of processing unit or processor subsystem.

Storage subsystem 1012 is usable by processing unit 1050 (e.g., to store instructions executable by and data used by processing unit 1050). Storage subsystem 1012 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage subsystem 1012 may consist solely of volatile memory, in one embodiment. Storage subsystem 1012 may store program instructions executable by computing device 1010 using processing unit 1050, including program instructions executable to cause computing device 1010 to implement the various techniques disclosed herein.

I/O interface 1030 may represent one or more interfaces and may be any of various types of interfaces configured to couple to and communicate with other devices, according to various embodiments. In one embodiment, I/O interface 1030 is a bridge chip from a front-side to one or more back-side buses. I/O interface 1030 may be coupled to one or more I/O devices 1040 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
receiving, by a computer system, a data stream that specifies data values of one or more variables as a function of time, wherein the data stream includes a current subset of data values and a plurality of previous subsets of data values;
determining, by the computer system, a predicted next sample for the data stream, wherein the determining includes:
performing one or more polyline simplification techniques on the current subset of data values to produce a reduced-sample current subset of data values;
converting the reduced-sample current subset of data values to an angular coordinate system;
storing the converted reduced-sample current subset of data values in a k-dimensional tree having a root node that includes converted reduced-sample previous subsets of data values that have been produced by performing the one or more polyline simplification techniques on ones of the plurality of previous subsets of data values, and converting resulting reduced-sample previous subsets of data values to angular coordinates;
determining, for the converted reduced-sample current subset of data values, one or more nearest neighbors from the converted reduced-sample previous subsets of data values stored in the tree; and
generating the predicted next sample for the data stream using the determined one or more nearest neighbors; and
performing, by the computer system prior to the predicted next sample occurring in the data stream, one or more preventative measures for a system from which the data stream was received, wherein the one or more preventative measures are performed based on the predicted next sample for the data stream.

2. The method of claim 1, wherein the one or more polyline simplification techniques include Visvalingam's algorithm.

3. The method of claim 1, wherein storing the reduced-sample current subset of data values includes, after determining the one or more nearest neighbors for the reduced-sample current subset of data values:
inserting the reduced-sample current subset of data values at a node in the tree that is determined by a comparison of the reduced-sample current subset of data values to ones of the reduced-sample previous subsets of data values; and
deleting an oldest one of the reduced-sample previous subsets of data values currently stored in the tree.

4. The method of claim 1, wherein determining the one or more nearest neighbors is performed using a nearest-neighbors algorithm that traverses the k-dimensional tree.

5. The method of claim 4, wherein the one or more nearest neighbors are those previous subsets of data values stored in the k-dimensional tree that have the lowest difference value relative to the current subset of data values, wherein a difference value for a given one of the previous subset of data values is computed by:
determining a sum of a square of differences of respective angular coordinates of the current subset of data values and the given previous subset of data values; and
calculating a square root of the determined sum as the difference value.

6. The method of claim 4, wherein the determining the one or more nearest neighbors includes:
traversing the k-dimensional tree, including making traversal decisions at multiple levels based on different samples of the reduced-sample current subset; and
performing a nearest-neighbors algorithm at a node of the k-dimensional tree that is based on the traversing.

7. The method of claim 6, wherein the nearest-neighbors algorithm includes:
iteratively updating a current node and a current nearest neighbor; and
upon determining that a difference value of the current node is not less than the difference value of the current nearest neighbor:
finding a sibling node of the current node that has a difference value that is less than the difference value of the current node; and
selecting a next of kin node of the sibling node as an updated current node, wherein the next of kin node is a child of the sibling node if the sibling node has one or more children or a parent of the sibling node if the sibling node does not have any child nodes.

8. The method of claim 6, wherein making traversal decisions at multiple levels based on different samples of the reduced-sample current subset includes:
comparing a first data sample of the reduced-sample current subset with a first sample of the reduced-sample previous subset stored at the root node of the tree;
traversing, based on comparing the first data samples of the current and previous subsets, to the subsequent level of the tree; and
comparing a subsequent data sample of the reduced-sample current subset with a subsequent data sample of one or more reduced-sample previous subset stored the subsequent level of the tree.

9. The method of claim 1, wherein each reduced-sample subset of data values in the tree is stored with a subsequent sample of the data stream relative to that reduced-sample subset of data values, and wherein each subsequent sample has a magnitude coordinate value and an angular coordinate value.

10. The method of claim 9, wherein determining the one or more nearest neighbors produces at least two nearest neighbors, and wherein generating the predicted next sample includes:
determining a predicted angular coordinate value based on an average of the angular coordinate values of the at least two nearest neighbors; and
determining a predicted magnitude coordinate value based on an average of the magnitude coordinate values of the at least two nearest neighbors.

11. A non-transitory computer-readable medium having instructions stored thereon that are executable by a computing device to perform operations comprising:
receiving a data stream that specifies data values of one or more variables as a function of time, wherein the data stream includes a current subset of data values and a plurality of previous subsets of data values;

determining a predicted next sample for the data stream, wherein the determining includes:

performing one or more polyline simplification techniques on the current subset of data values to produce a reduced-sample current subset of data values;

converting the reduced-sample current subset of data values to a different coordinate system;

storing the converted reduced-sample current subset of data values in a tree data structure that stores converted reduced-sample previous subsets of data values of the data stream, wherein the converted reduced-sample previous subsets of data values are expressed in the different coordinate system;

performing a nearest-neighbors routine to determine, for the converted reduced-sample current subset of data values, one or more converted reduced-sample previous subsets of data values stored in the tree data structure that have a lowest difference value relative to the converted reduced-sample current subset of data values; and generating the predicted next sample for the data stream using output of the nearest-neighbors routine; and performing, prior to the predicted next sample occurring in the data stream, one or more preventative measures for a system from which the data stream was received, wherein the one or more preventative measures are performed based on the predicted next sample for the data stream.

12. The non-transitory computer-readable medium of claim 11, wherein performing the nearest-neighbors routine includes:

traversing the tree data structure, including making traversal decisions at multiple levels of the tree data structure based on different samples of the reduced-sample current subset; and performing the nearest-neighbors routine at a node of the tree data structure that is based on the traversing.

13. The non-transitory computer-readable medium of claim 12, wherein the nearest-neighbors routine includes:

iteratively updating a current node and a current nearest neighbor, including:

upon determining that a difference value of a current node is not less than the difference value of the current nearest neighbor:

in response to determining that a sibling node of the current node has a difference value that is less than the difference value of the current node, selecting a next of kin node of the sibling node as an updated current node, wherein the next of kin node is a child of the sibling node if the sibling node has one or more children or a parent of the sibling node if the sibling node does not have any child nodes; and in response to determining that a sibling node of the current node does not exist that has a difference value that is less than the difference value of the current node, selecting a parent node of the current node as an updated current node; and upon determining that that a difference value of a current node is less than the difference value of the current nearest neighbor, selecting the current node as an updated current nearest neighbor.

14. The non-transitory computer-readable medium of claim 13, wherein performing the nearest-neighbors routine includes executing the iteratively updating until the current node is a root node of the tree data structure.

15. The non-transitory computer-readable medium of claim 11, wherein the different coordinate system is an angular coordinate system having a theta coordinate, and wherein each difference value computed in the nearest-neighbors routine is based on a difference of respective theta values for each sample in the converted reduced-sample current subset of data values and each corresponding sample in the converted reduced-sample previous subset of data values for which the difference value is being computed.

16. A system, comprising:

at least one processor; and a memory having instructions stored thereon that are executable by the at least one processor to cause the system to:

determine, for time series data that specifies a characteristic of a computer system, a current subset of data values;

determine a predicted next value of the characteristic for the time series data, including by:

performing one or more simplification techniques on the current subset of data values to produce a reduced-sample current subset of data values;

converting the reduced-sample current subset of data values to an angular coordinate system;

traversing a space partitioning data structure that stores converted reduced-sample previous subsets of data values for the time series data to determine one or more nearest neighbors to the converted reduced-sample current subset of data values; and generating the predicted next value for the times series data using the determined one or more nearest neighbors; and performing, prior to the predicted next value occurring in the time series data, one or more preventative measures for the computer system, wherein the one or more preventative measures are performed based on the predicted next value for the time series data.

17. The system of claim 16, wherein the computer system is a database computer system, and wherein the characteristic is a load characteristic of the database computer system.

18. The system of claim 16, wherein the one or more simplification techniques include a polyline simplification technique, and wherein the space partitioning data structure is a k-dimensional tree.

19. The system of claim 18, wherein the at least one processor is configured to determine the one or more nearest neighbors by:

traversing the k-dimensional tree, including making traversal decisions at multiple levels based on different samples of the reduced-sample current subset.

20. The system of claim 19, wherein the at least one processor is configured to perform a nearest-neighbors algorithm at a node of the k-dimensional tree that is based on the traversing, and continue performing the nearest-neighbors algorithm until a root node of the k-dimensional tree is reached.

* * * * *